United States Patent [19]

Wagatsuma et al.

[11] 4,400,608
[45] Aug. 23, 1983

[54] WELDING ELECTRODE PAIR AND METHOD OF WELDING

[75] Inventors: Yuuji Wagatsuma, Yokosuka; Hideaki Naruo, Yokohama, both of Japan

[73] Assignee: Tokyo Shibaura Denki Kabushiki Kaisha, Kawasaki, Japan

[21] Appl. No.: 321,105

[22] Filed: Nov. 13, 1981

Related U.S. Application Data

[63] Continuation of Ser. No. 142,658, Apr. 22, 1980, abandoned.

[30] Foreign Application Priority Data

Apr. 27, 1979 [JP] Japan .................................. 54-52311

[51] Int. Cl.³ ...................... B23K 11/30; B23K 11/32
[52] U.S. Cl. .................................... 219/107; 219/119
[58] Field of Search ...................... 219/78.01, 119, 107

[56] References Cited

U.S. PATENT DOCUMENTS 896,218 8/1908 Lachman ............................ 219/119

FOREIGN PATENT DOCUMENTS 52-66851 6/1977 Japan .................................. 219/119

Primary Examiner—Elliot A. Goldberg
Attorney, Agent, or Firm—Finnegan, Henderson, Farabow, Garrett & Dunner

[57] ABSTRACT

A welding electrode pair of the present invention has substantially columnar first and second welding electrodes coaxially disposed so that their respective tip end faces face each other. Formed on the tip end face of the first welding electrode is a first contact portion protruding therefrom and extending substantially in parallel thereto across the tip end face. Formed on the tip end face of the second welding electrode are second contact portions protruding therefrom substantially in parallel with the tip end face and the first contact portion as if the second contact portions were fit over the first contact portion, extending across the tip end face, and having a substantially circular arc portion at the projected end thereof.

7 Claims, 9 Drawing Figures

WELDING ELECTRODE PAIR AND METHOD OF WELDING

This is a continuation of application Ser. No. 142,658, filed 4/22/80, now abandoned.

This invention relates to a welding electrode pair composed of first and second welding electrodes which hold plate and rod materials interposed between the facing end faces of the two electrodes, with the surface of the plate material on the longitudinal side face of the rod material, and resistance-weld the plate and rod materials together by the action of a current flow caused between the electrodes. The welding electrode pair is adapted to resistance-weld plate and rod materials formed of high-solidity, high-melting-point metals. Typical examples of such metals include molybdenum and tungsten.

Welding of such plate and rod materials has conventionally been performed. Well-known products of such welding include a seal portion of a high-pressure discharge lamp, that is, a combination of a molybdenum wire and a molybdenum foil inserted in the luminous part of the lamp. Prior art welding electrode pairs, however, are less than perfect, since all conventional welding electrodes to hold plate and rod materials therebetween have flat tip end faces from which welding current is supplied. That is, as resistance welding of plate rod materials is repeated, the flat tip end face of the welding electrode touching the rod materials is gradually worn losing its flatness, so that the contact between such end face and each rod material may often be obtained at limited points or even at a single point. As a result, the current density at each contact point is greatly increased, so that the tip end face of the welding electrode may be fused with the rod material. Practically, it is impossible to reduce the welding current to avoid such an awkward situation. Reduction in the welding current results in a reduction in the welding strength of the plate and rod materials.

Thus, there has been a demand for the development of welding electrode pairs which are not susceptible to such fusion peculiar to the welding with use of the prior art electrodes.

The object of this invention is to provide a welding electrode pair adapted to hold rod and plate materials for resistance welding, with the longitudinal side face of the rod material on the surface of the plate material, and capable of welding together the plate and rod materials with sufficient strength without causing a welding electrode touching the rod material to be fused with the rod material.

In order to attain the above object, a first welding electrode included in the welding electrode pair of this invention has one or more first contact portions protruding therefrom and touching the plate material, while a second welding electrode is provided with two or more second contact portions protruding therefrom and touching the rod material.

With such welding electrode pair, the current flowing from the rod material to the second welding electrode (although the direction of the welding current, being an AC current, is reversed periodically, the welding current is supposed, for simplicity, to flow from the first welding electrode to the second via the plate and rod materials in order) passes through at least two contact portions. Unlike the case of the prior art welding electrodes, therefore, there will never be produced such a situation that the second welding electrode will touch the rod material substantially at a single point to cause the welding current to flow through only such point after the welding is repeated many times. Consequently, the welding current flowing from the rod material to each of the contact portions of the second welding electrode becomes smaller as compared with the current flowing through the single contact portion of the prior art welding electrodes, so that the rod material and the second welding electrode will never be fused together.

As a result of the use of the first contact portion formed on the first welding electrode, the contact area through which the welding current flows from the plate material to the rod material is reduced as compared with the contact area obtained with use of a first welding electrode without the first contact portion, and hence the density of the welding current flowing through the contact area is increased. Thus, the rod and plate materials are firmly welded together. Here it is to be noticed that heat generated by the current flowing from the first welding electrode to the plate material and heat generated by the current flowing from the rod material to the second welding electrode are allowed to escape through their corresponding welding electrodes by the cooling effect of these electrodes which are considerably large in size, reducing the possibility of fusion between the first welding electrode and the plate material as well as between the second welding electrode and the rod material. Since higher welding strength may be obtained with use of the welding electrode pair of this invention than with the prior art welding electrodes, it will be possible to reduce the welding current if the welding strength can be limited to the level for the prior art welding electrodes. Further, the improved welding strength makes it possible to eliminate the use of an interposition member such as platinum or tantalum which has conventionally been interposed between the plate and rod materials for higher welding strength. Such elimination is advisable, since it will simplify the welding operations and do away with the costly materials.

According to a preferred embodiment of this invention, the first and second contact portions, which are one and two in number, respectively, are parallel to one another, and the rod material to be welded to the plate material is usually disposed at right angles to both contact portions so as to be held between these contact portions. Further, the relative positions of the first and second contact portions to ensure the effect of the invention are such that the center of the single first contact portion on the first welding electrode is in alignment with the center of an interval between the two second contact portions on the second welding electrode along the direction of the central axis of the welding electrode pair extending in the longitudinal direction thereof. By locating the contact portions in such relative positions, the plate and rod materials pressed by the first contact portion can securely touch both of the second contact portions. Moreover, the contact between the plate and rod materials may further be secured with ease by forming a convexity at the tip end of the first contact portion.

Alternatively, a plurality of contact portions may be formed on each of the first and second welding electrodes. In this case, the first and second contact portions should be so located as alternately to hold the plate and rod materials from both sides, and a convexity should preferably be formed on the tip end of each first contact portion. This will easily be understood from the description of the above embodiment using one first contact portion and two second contact portions.

This invention can be more fully understood from the following detailed description when taken in conjunction with the accompanying drawings, in which.

Figure 1:
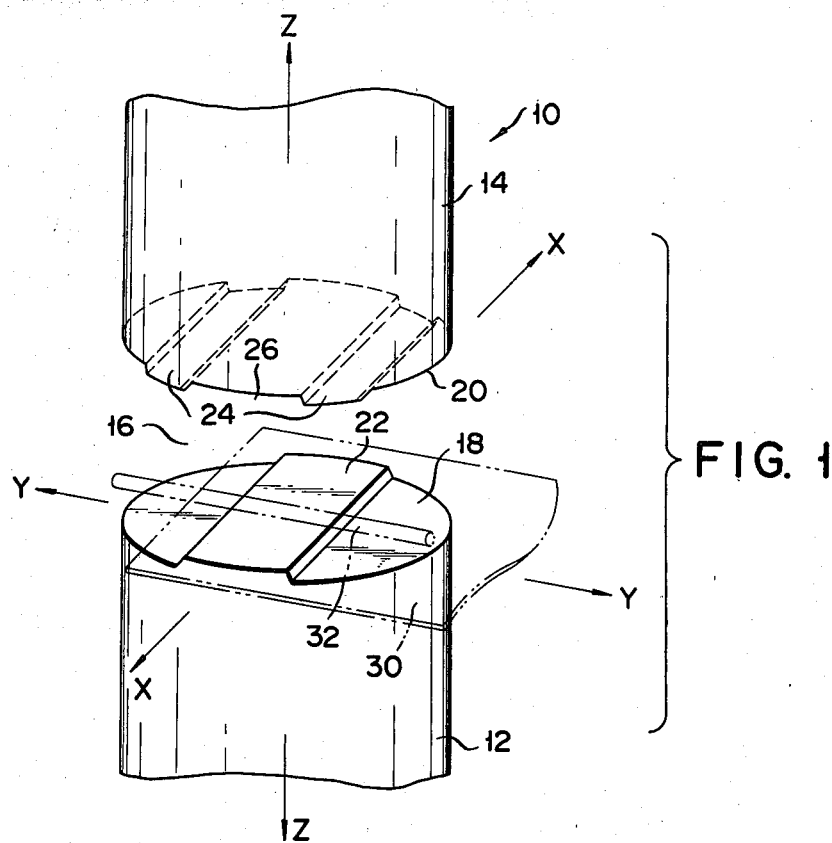
FIG. 1 is a perspective view showing the relative positions of rod and plate materials interposed between first and second welding electrodes of the welding electrode pair of this invention which are spaced from each other.

Referring now to the drawings of FIGS. 1, 2 and 3, there will be described a preferred embodiment of this invention. In FIG. 1, a welding electrode pair 10 is formed of a first welding electrode 12 and a second welding electrode 14. The first and second welding electrodes 12 and 14 are substantially cylindrical, and are in alignment with each other along the direction Z—Z as illustrated, that is, along the longitudinal direction of the welding electrode pair which is set in the vertical direction. On respective end faces 18 and 20 of the welding electrodes 12 and 14 facing each other across a space 16, there are one and two parallel ridges, respectively. The direction in which the ridges extend will hereinafter be referred to as longitudinal direction or direction X—X; the direction at right angles to both directions X—X and Z—Z as traverse direction or direction Y—Y. Ridge 22 is formed on the first welding electrode 12 as first contact portion, and ridges 24 are formed on the second welding electrode 14 with an interval 26 between as second contact portions.

The two second contact portions 24 are formed with the space 16 left between them and the first contact portion 22 is so located as to face the interval 26 between the second contact portions 24. The center line of the interval 26 of FIG. 2 along the direction Z—Z is in alignment with the center line of the first contact portion 22 along the direction Z—Z. The first and second welding electrodes 12 and 14 can move relatively in the direction Z—Z to hold plate and rod materials to be welded therebetween. As shown in FIGS. 1, 2 and 3, a plate material 30 is set on the first contact portion 22, and a rod material 32 is laid on the plate material 30 along the direction Y—Y. In FIG. 1, the two welding electrodes 12 and 14 are spaced from each other in the direction Z—Z, and the plate material 30 and rod material 32 to be held between the electrodes 12 and 14 are represented by imaginary lines. In FIGS. 2 and 3, the electrodes 12 and 14 holding the plate and rod materials 30 and 32 between are viewed along the directions X—X and Y—Y, respectively.

Now there will be described operations for welding the plate and rod materials 30 and 32 together by using the welding electrode pair 10. First, the second welding electrode 14 is raised by means of a suitable conventional lift apparatus (not shown), the plate material 20 is put on the first contact portion 22 within the space 16 created by such raising, and then the rod material 32 is laid on the plate 20 substantially at right angles to the first contact portion 22. Then, the second welding electrode 14 is moved by means of the lift apparatus, and the plate and rod materials 30 and 32 are interposed between the first and second contact portions 22 and 24, and pressed with a given pressure. Subsequently, welding current is caused to flow between the first and second welding electrodes by properly using a known welding power source, and resistance welding of the plate and rod materials 30 and 32 is performed.

Figure 2:
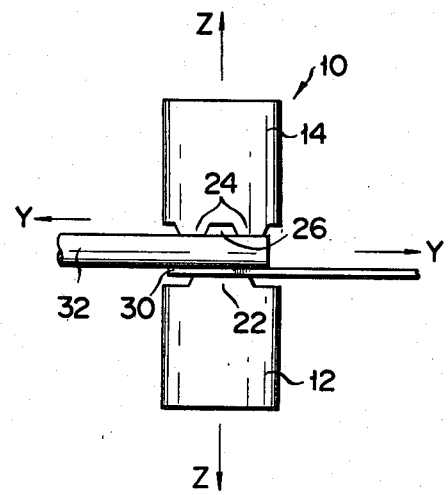
FIG. 2 is a front view of the welding electrode pair of FIG. 1.
Figure 3:
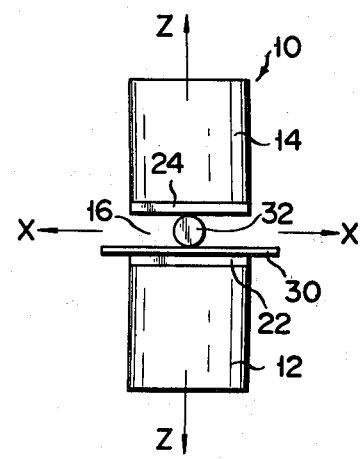
FIG. 3 is a side view of the welding electrode pair of FIG. 1.

In the aforementioned welding processes, the second contact portions 24 of the second welding electrode 14 with the interval 26 provided therebetween is pressed against the rod material 32, while the single first contact portion 22 formed on the first welding electrode 12 is oppositely pressed against a portion of the rod material 32 corresponding to the interval 26 across the thickness of the plate material 30, as shown in FIG. 2. Thus, the plate and rod materials 30 and 32 are pressed in opposite directions at alternate positions. Without respect to their surface conditions, therefore, the two second contact portions 24 are securely brought in contact with the rod material 32 at at least at two points, and the current path is split. Accordingly, unlike the case of the prior art welding electrodes, the second contact portions 24 will never be fused with the rod material 32 if the surfaces of the welding electrodes are worn out. Unlike the conventional case, moreover, the first welding electrode 12 presses on the rod material 32 across the thickness of the plate material 30 over a length shorter than the diameter of the first welding electrode 12, so that the contact area is smaller with these welding electrodes of the invention than with the prior art welding electrodes. As a result, intense heat is produced at the contact region, ensuring high-strength resistance welding between the plate and rod materials 30 and 32.

Figure 6:
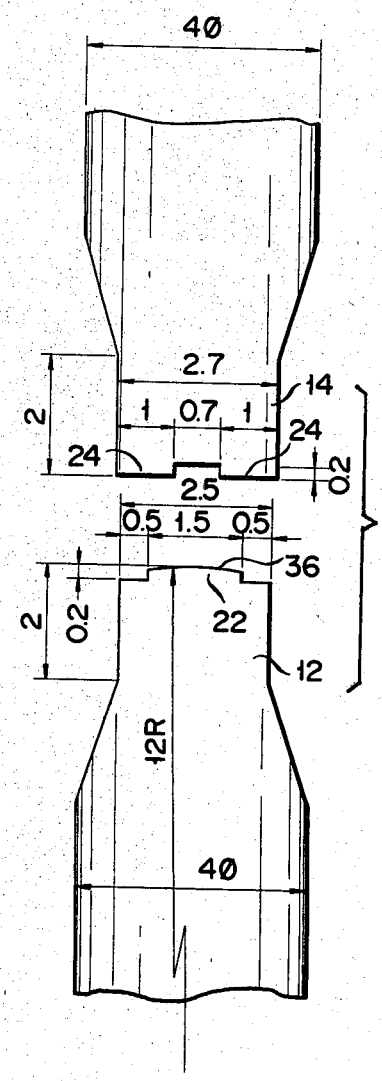
FIGS. 6 and 7 are front and side views of a welding electrode pair used for the strength comparison test of FIG. 5, respectively.
Figure 8:
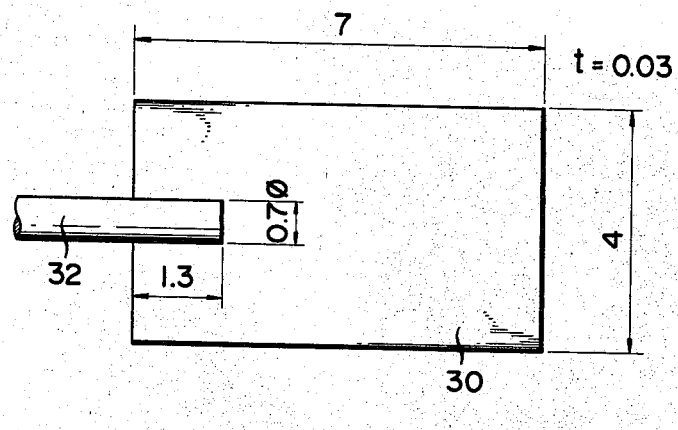
FIG. 8 is a front view of a subject, i.e. a combination of plate and rod materials welded together, used for the strength comparison test of FIG. 5.

Preferably, as seen in FIGS. 6 and 8, rod material 32 is about 0.7 mm in diameter, plate material 30 is about 0.03 mm in thickness, single contact portion 22 is about 1.5 mm wide, the radius of curvature of the top surface 36 of single contact portion 22 is about 12 mm, the maximum height of single contact portion 22 above the end face of first electrode 12 is about 0.2 mm, the width of the space of the two contact portions 24 is about 0.7 mm, and the height of each of the two contact portions 24 is about 0.2 mm above the end face of second electrode 14.

Figure 4:
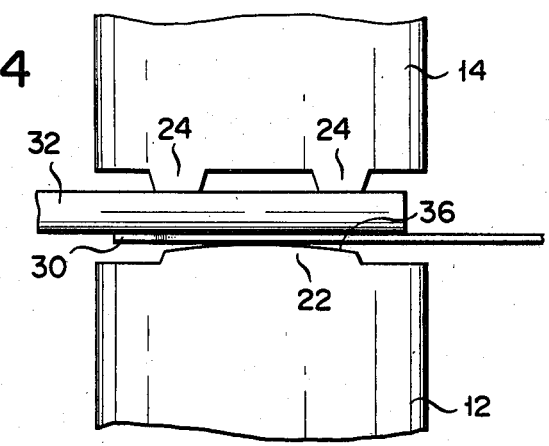
FIG. 4 is front view of a modification of the welding electrode pair shown in FIG. 1.

Although in the above embodiment the first and second welding electrodes 12 and 14 have the single first contact portion 22 and the two second contact portions 24, respectively, each welding electrode may have a plurality of contact portions. In this case, the location and the number of contact portions are preferably determined so that the first and second contact portions 22 and 24 may alternately press on the plate and rod materials 30 and 32 from both sides. More preferably, the first contact surface 22 has a convexity formed thereon. FIG. 4 is a partial enlarged view showing a modification of the first contact portion 22 of FIG. 2 in which the cross-section perpendicular to direction X—X of convex portion 36 is a portion of a circle preferably having a radius of about 12 mm. Thus, as seen in FIGS. 4 and 6, the surface 36 of contact portion 22 gently curves across its width from its center toward the end face of first electrode 12.

Figure 5:
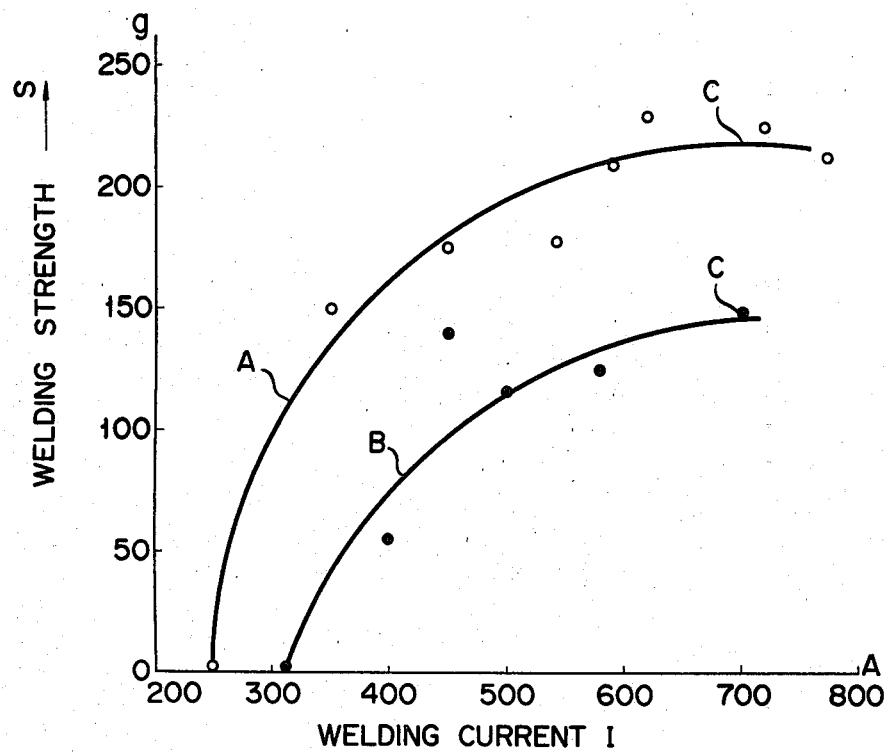
FIG. 5 shows curves for comparing the welding strength between welded materials obtained with use of the welding electrode pair of the invention and a prior art welding electrode pair.
Figure 7:
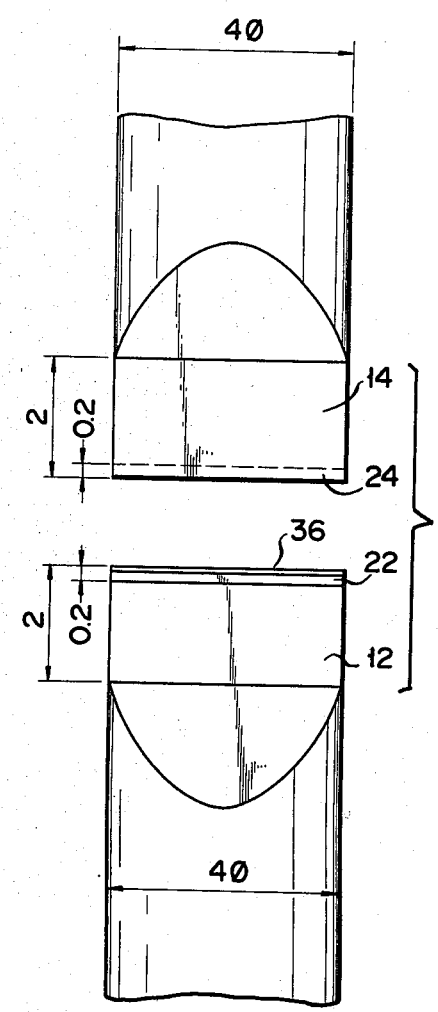
Figure 9:
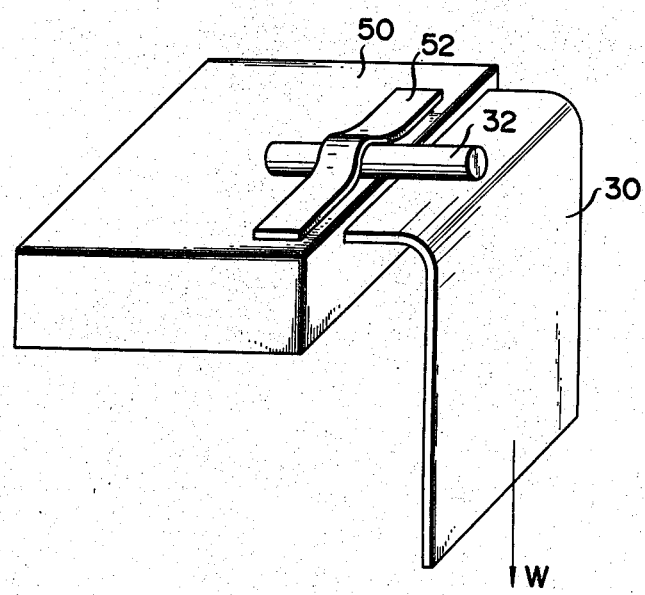
FIG. 9 shows a method for obtaining test data of FIG. 5.

FIG. 5 is a graph in which a curve A shows the relationship between the welding current and the welding strength obtained when plate and rod materials are resistance-welded with use of the embodiment of FIG. 4, while a curve B shows a similar relationship obtained with use of the prior art welding electrode pair. The detailed shape and dimensions (mm) of the welding electrode pair used to obtain the curve A are shown in the front and side views of FIGS. 6 and 7. Further, FIG. 8 shows the shape and dimensions (mm) of a member formed by welding with use of the welding electrode pair of FIGS. 6 and 7, and FIG. 9 shows a method for testing the welding strength between the plate and rod materials 30 and 32. In FIG. 9, numeral 50 designates a fixed base on which the rod material 32 welded to the plate material 30 is securely mounted by means of a fitting member 52. One end of the plate material 30 is pulled in the direction of an arrow W of FIG. 9 by a suitable means. The force to draw the plate material 30 in the direction of the arrow W, i.e. the welding strength, is measured by using a measuring instrument (not shown). The W-direction tensile force is increased gradually, and the value of the force applied at a point of time when the plate material 30 is torn off the rod material 32 is measured. With such force S (gram) as the axis of ordinate and AC welding current I (ampere) used for the welding of the plate and rod materials as the axis of abscissa, the curve A of FIG. 5 is plotted in accordance with the values of force S obtained for varied values of welding current. The curve B represents the results of measurement obtained in the same manner with the curve A when the prior art welding electrode pair without the first and second contact portions 22 and 24 shown in FIGS. 6 and 7 is used. The welding of the subject materials used in this measurement requires that the welding electrodes be connected to a terminal of a welding transformer with secondary voltage of 4 V, that the welding pressure between the welding electrodes be 5 kg, and that the current flow time be a time equivalent to one cycle of applied voltage. Further, the material of the first and second welding electrodes is tungsten, and the plate and rod materials 30 and 32 are made of molybdenum. Circles of FIG. 5 represent measured values obtained with use of the welding electrode pair of FIGS. 6 and 7, while black spots represent values obtained with use of the prior art welding electrode pair. That is, the curves A and B are welding strength curves of welding electrode pair obtained on the basis of the measured values represented by the circles and black spots, respectively. Points C on the graph are each a point at which deposition of the rod material onto the second welding electrode occurs due to the excessive welding current flow. It can be seen from the curves A and B that the welding electrode pair of this invention provides higher welding strength than the conventional one does.

What we claim is:

1. In a process for welding a plate to an elongated rod along the length of said rod wherein the plate and rod are placed and held in contacting relationship between cooperating, substantially parallel end faces of first and second electrodes which are energized in an amount and for a time sufficient to effect welding of said rod and plate, said first and second electrodes having axes normal to the planes of said end faces and aligned with each other and being movable in the direction of the common axis, the improvement comprising the steps of:
   (a) forming said first electrode with a single contact portion projecting from and having a length extending across the end face thereof for contact with said plate, the top surface of said single contact portion being gently curved across its width toward said end face; and
   (b) forming said second electrode with two spaced contact portions projecting from and each having a length extending across the end face thereof, said two contact portions being substantially parallel to said single contact portion and said single contact portion being aligned with the space between said two contact portions, said two contact portions contacting said rod in substantially perpendicular relationship and cooperating with said single contact portion to hold said plate and rod in contacting relationship during welding.

2. A process for welding a plate to an elongated rod along the length of said rod, comprising:
   (a) placing said plate and rod in contacting relationship between cooperating, substantially parallel end faces of first and second electrodes, said electrodes being movable toward and away from each other along a common axis normal to said end faces, said first electrode including a single contact portion projecting from and having a length extending across the end face thereof and a width substantially less than the diameter of the end face thereof, the top surface of said single contact portion being gently curved across its width toward said end face, and said second electrode including two spaced contact portions projecting from and each having a length extending across the end face thereof and a width substantially less than the diameter of the end face thereof and being substantially parallel to said single contact portion, said single contact portion being aligned with the space between said two contact portions;
   (b) orienting said plate and rod to dispose said plate adjacent the top surface of said single contact portion and to dispose said rod adjacent and substantially normal to the length of the top surfaces of said two contact portions;
   (c) moving said first and second electrodes together to contact said plate with said single contact portion and said rod with said two contact portions and to hold said plate and rod together with predetermined pressure applied in opposite directions by relatively narrow surfaces at alternate positions; and
   (d) passing welding current between said first and second electrodes through said single contact portion, said plate, said rod and said two contact portions in an amount and for a time sufficient to effect welding of said rod and plate, wherein the heat generated by said current is concentrated over the width of said first and second contact portions.

3. The process of claim 1 wherein the rod material is about 0.07 mm in diameter, the plate material is about 0.03 mm in thickness, the single portion of the first welding electrode is about 1.5 mm in width, the radius of curvature of the top surface of said single contact portion is about 12 mm and the maximum height of said single contact portion is about 0.2 mm.

4. The process of claim 3 wherein the space between the two contact portions on the end face of the second electrode welding electrode is about 0.7 mm wide and the height of each said two contact portions is about 0.2 mm above the end face.

5. In a welding electrode pair for welding a rod material to a plate material along the length of said rod material, wherein said rod material and plate material are held in contacting relationship between cooperating, substantially parallel end faces of first and second welding electrodes, said electrodes having axes aligned with each other and being movable in a direction of the common axis, the improvement comprising:

(a) a single contact portion projecting from and having a length extending completely across the end face of said first welding electrode for supporting said plate material, the top surface of said single contact portion being gradually curved across its width toward the end face; and (b) two spaced contact portions projecting from and each having a length extending completely across the end face of said second welding electrode, said two contact portions being substantially parallel to said single contact portion and said single contact portion being aligned with the space between said two contact portions for holding said rod material between said two contact portions and said plate material, said rod material being disposed substantially normal to said two contact portions.

6. The welding electrode pairs in claim 5 wherein the rod material is about 0.7 mm in diameter, the plate material is about 0.03 mm in thickness, the single contact portion of said first welding electrode is about 1.5 mm in width, the radius of curvature of the top surface of said single contact portion is about 12 mm and the maximum height of said single contact portion is about 0.2 mm.

7. The welding electrode pairs in claim 6 wherein the space between said two contact portions on the end face of said second welding electrode is about 0.7 mm wide and the height of each said two contact portions is about 0.2 mm above said end face.

* * * * *